A. R. GROUNDS.
HARVESTING IMPLEMENT.
APPLICATION FILED FEB. 12, 1919.
1,344,033.
Patented June 22, 1920.
2 SHEETS—SHEET 1.
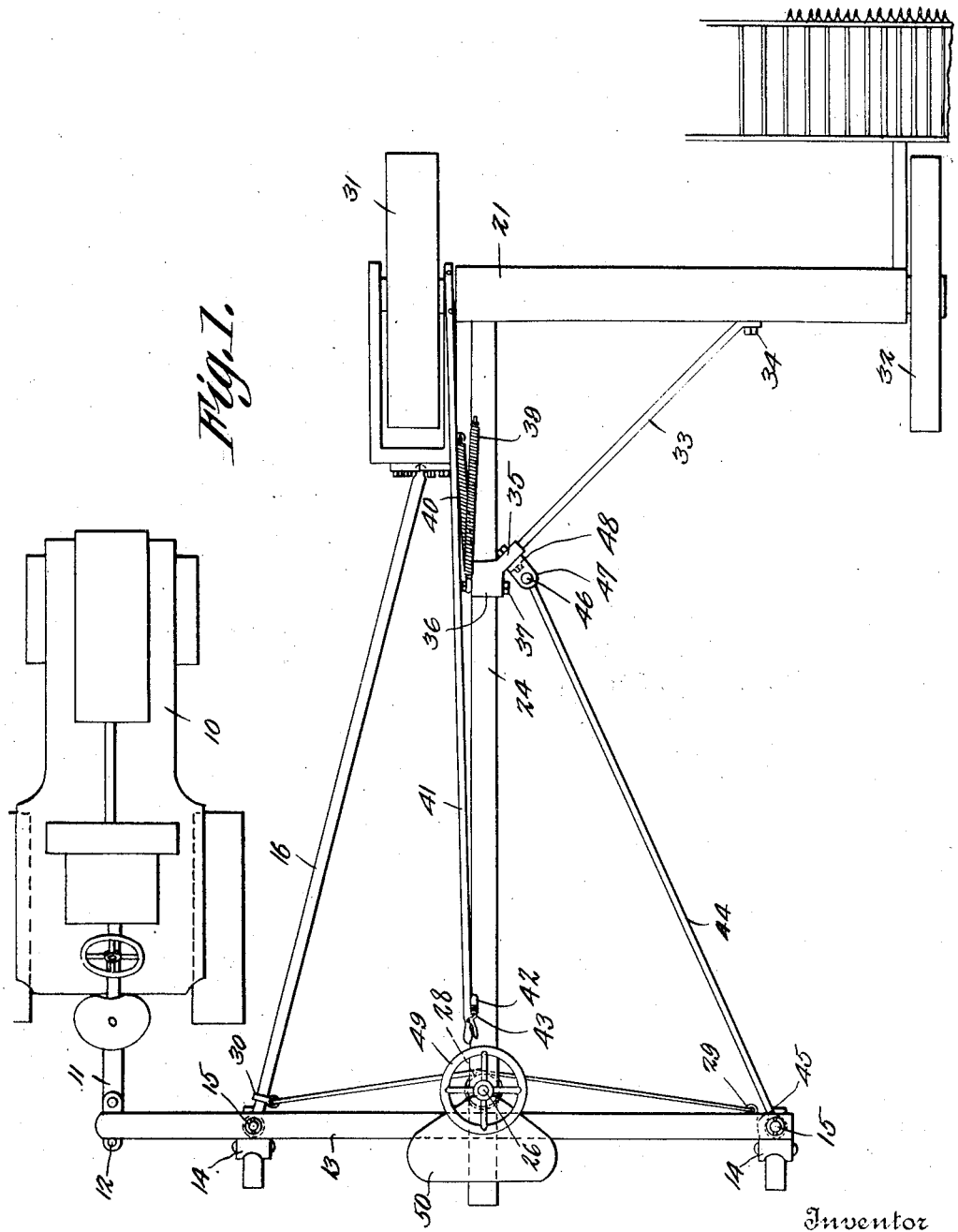
Inventor,
Albert R. Grounds,
By
Attorney A. R. GROUNDS.
HARVESTING IMPLEMENT.
APPLICATION FILED FEB. 12, 1919.
1,344,033.
Patented June 22, 1920.
2 SHEETS—SHEET 2.
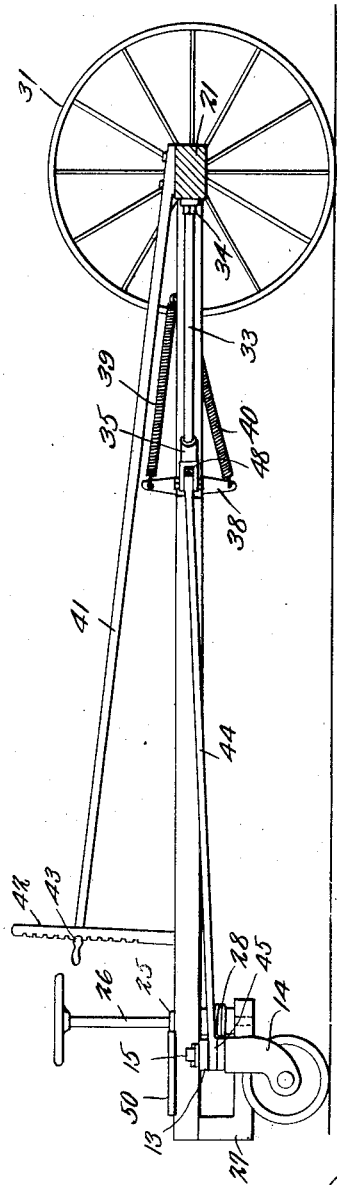
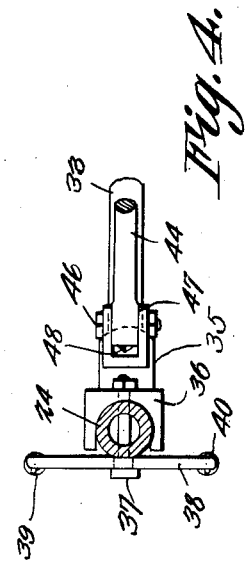
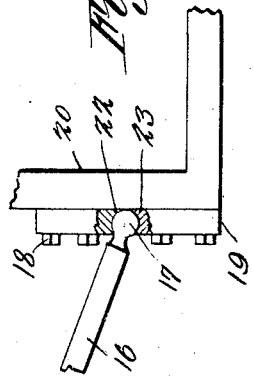
Inventor,
Albert R. Grounds,
By Franks. Awaleman,
Attorney.

UNITED STATES PATENT OFFICE.

ALBERT R. GROUNDS, OF HOOKER, OKLAHOMA.

HARVESTING IMPLEMENT.

1,344,033.  Specification of Letters Patent.  Patented June 22, 1920.

Application filed February 12, 1919. Serial No. 276,577.

*To all whom it may concern:*

Be it known that I, ALBERT R. GROUNDS, a citizen of the United States of America, and resident of Hooker, in the county of Beaver and State of Oklahoma, have invented certain new and useful Improvements in Harvesting Implements, of which the following is a specification.

This invention relates to harvesters and particularly to power applying and guiding means for headers and like implements, the said invention having for its object the provision of novel means whereby the implement may be guided independently of the tractor and be free to move tangentially with respect to the direction of movement of the tractor, thus making it possible to cause the implement to travel to the end of a cut or field or to be guided clear of some obstruction or rough land without changing the direction of travel of the tractor.

A further object of this invention is to provide means applicable to implements now in common use whereby it is possible to convert said implement and supply it with means for accomplishing the result intended. I have used the term "implement" herein and it is to be understood that I mean thereby any grain cutting machine having the characteristics of a header.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a plain view of a fragment of a header showing the invention applied thereto and a tractor attached to the draft rigging;

Fig. 2 illustrates a side elevation, partly in section;

Fig. 3 illustrates a detail view of the frame and the push rod attached thereto; and Fig. 4 illustrates a sectional view on the line 4—4 of Fig. 1.

In these drawings 10 denotes a tractor which is shown conventionally, the same having a draw bar 11 and a coupling 12 of any appropriate type by which it is connected to the beam 13.

The draft beam 13 is supported by casters 14, the shanks 15 of which may extend through the beams, and the shank of one of the casters constitutes a pivot on which the push rod or bar 16 is applied, the opposite end of the said push bar carrying a ball 17 which is held by the plates 18 and 19 attached to the frame 20, the said frame, in the present application of the invention, being U-shaped and connected to the axle 21 of the header, it being understood that the said axle carries the usual cutting appliances with the knives and the frame is intended to be raised and lowered for the purpose of regulating the height of the cut of the knives, so that it is desirable to have a universal joint between the push rod and the frame as accomplished through the use of the ball and socket arrangement existing between the push rod and the plates 18 and 19. It will be seen that the contiguous edges of the plates have sockets 22 and 23 respectively formed therein.

A push beam 24 extends rearwardly from the axle 21 and it has a bearing 25 for the tiller shaft 26, the said tiller shaft being journaled in a bracket 27 attached to the push beam. The tiller shaft has a drum 28 around which a flexible connection is wound in a manner so that the two ends of the flexible member are alternately drawn toward the tiller shaft as the direction of rotation of the said tiller shaft is reversed and one end of the flexible member is anchored to the draft beam 13 by the fastening 29 and the opposite end of said flexible member is connected to a clip 30 on the push bar 16, so that when the tiller shaft is rotated in one direction, the push beam 24 will be pulled toward one end of the beam 13 and when the said shaft is rotated in the opposite direction, the push beam 24 will be moved in the opposite direction, thus changing the position of the axle 21 with respect to the beam 13 and changing the course of travel of the cutters. The shaft 21 is of course mounted on the wheels 31 and 32 as is ordinarily done with implements of this kind.

A brace rod 33 is attached to the axle 21 by a bolt 34 and the opposite end of the said brace rod extends into a socket 35 formed on the clip 36, the said clip being secured to the beam 24 by the bolt 37, the said bolt also constituting a support for the lever 38 which is oscillatably mounted on the said rod.

The lever 38 has a spring 39 connected to it and the opposite end of the said spring is anchored to the push beam 24 whereas a spring 40 which is connected to the opposite end of the lever 38 is connected to the frame 20, the purpose of the springs being to facilitate the movement of the frame as it is manipulated by an operator for the purpose of changing the position of the cutting members. An arm 41 is utilized for the purpose of tilting the frame 20 and it operates in connection with a notched standard 42 and a detent 43 which holds the arm in different positions of adjustment. An operator may, however, speedily change the position of the arm for the purpose stated.

A link 44 has one end pivoted on the shaft of the caster wheel at one end of the draft beam 13, and the opposite end of the said link is mounted on a pivot 46 which extends through a lug 47 of the clip 48 which clip is attached to the brace 33 near its point of attachment to the push beam 24 so that when the beam 24 is oscillated, the shaft may oscillate with respect to the beam 13 while at the same time, the propelling force of the tractor is communicated through the push rod, link and brace to the axle 21.

The axle 21 and wheels 31 and 32 may be termed a front truck constituting a support for the cutting apparatus and as the frame 20 which constitutes a part of the cutting apparatus is oscillated, the front portion of the cutting apparatus may be elevated or lowered.

When the push beam 24 is moved toward the end of the beam 13, to which the tractor is coupled, the truck is moved with relation to the beam 13 so that the wheel 31 will be in advance of the wheel 32 which will cause the truck to travel away from the tractor, whereas an opposite movement of the push beam 24 will reverse the direction of travel of the truck, and as the tiller shaft is supplied with a hand wheel 49, the manipulation may be accomplished without undue exertion.

A platform 50 may be carried by the beam 40 to be occupied by an operator.

I claim—

1. In combination with a harvester, a push beam connected to an axle of the harvester, a draft beam with relation to which the push beam oscillates, means for moving the push beam with relation to the draft beam, a bracket secured to the push beam, a brace rod extending from the bracket to the aforesaid axle, a link pivotally connected to the said bracket and to the draft beam, a push rod connected to the draft beam and to a portion of the truck of the harvester, means for oscillating the truck vertically, and means for holding the truck in normal position.

2. In combination with a harvester having a truck and an axle, a draft beam, means for holding the draft beam in spaced relation to the said axle and for communicating the motion of the draft beam to the said axle, a push beam connected to the axle and oscillatable with relation to the draft beam, a member for rotating the axle, and spring members for assisting the movement of the axle rotating member.

3. In combination with a harvester having a frame and an axle, a push beam connected to the axle, a draft bar with relation to which the push beam is oscillatably mounted, a brace rod connecting the axle and the push beam, a link pivotally connected to the draft beam and mediately connected to the brace rod, a push rod pivotally connected to the draft beam, a universal joint between the said push rod and the frame whereby the frame may oscillate, and means for oscillating the said frame.

ALBERT R. GROUNDS.